US012767074B2

(12) United States Patent
Kuratomi

(10) Patent No.: US 12,767,074 B2
(45) Date of Patent: Oct. 20, 2026

(54) ON-VEHICLE SHUTOFF CONTROL DEVICE

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Takahiro Kuratomi, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 170 days.

(21) Appl. No.: 18/835,887

(22) PCT Filed: Feb. 8, 2022

(86) PCT No.: PCT/JP2022/004797
§ 371 (c)(1),
(2) Date: Aug. 5, 2024

(87) PCT Pub. No.: WO2023/152786
PCT Pub. Date: Aug. 17, 2023

(65) Prior Publication Data

US 2025/0145096 A1 May 8, 2025

(51) Int. Cl.
*B60R 16/033* (2006.01)

(52) U.S. Cl.
CPC .................................. *B60R 16/033* (2013.01)

(58) Field of Classification Search
CPC ................................ B60R 16/033; H01H 9/54
USPC ......................................................... 361/93.4
See application file for complete search history.

(56) References Cited

U.S. PATENT DOCUMENTS

| | | | | |
|---|---|---|---|---|
| 6,300,818 | B1 * | 10/2001 | Mao | H02M 3/156 323/907 |
| 8,081,410 | B1 * | 12/2011 | Wang | H02J 7/663 361/93.1 |

FOREIGN PATENT DOCUMENTS

| | | | | |
|---|---|---|---|---|
| JP | 2001-095138 | A | | 4/2001 |
| JP | 2007-236061 | A | | 9/2007 |
| JP | 2012075262 | A | * | 4/2012 |

OTHER PUBLICATIONS

Machine translation of Tomita Japanese Patent Document JP 2012-75262 A Apr. 2012 (Year: 2012).*

(Continued)

*Primary Examiner* — Kevin J Comber
(74) *Attorney, Agent, or Firm* — Brooks Kushman, P.C.

(57) ABSTRACT

In an on-vehicle shutoff control device, a control unit switches a switch unit to an off state in a case where the switch unit is in the on state and a current value changes from less than a threshold value to the threshold value or more. The control unit switches the switch unit to the on state in at least one of a case where the switch unit has remained in the off state and a potential difference across the switch unit has been continuously maintained less than a reference for a predetermined period of time, a case where a speed of increase of potential difference across the switch unit is less than a reference, and a case where the potential difference across the switch unit is less than a reference at a time when a predetermined period of time passes after switching the switch unit to the off state.

10 Claims, 7 Drawing Sheets

(56) References Cited

OTHER PUBLICATIONS

International Search Report, Application No. PCT/JP2022/004797, mailed Apr. 19, 2022. ISA/Japan Patent Office.

* cited by examiner

ON-VEHICLE SHUTOFF CONTROL DEVICE

CROSS-REFERENCE TO RELATED APPLICATIONS

This application is the U.S. national stage of PCT/JP2022/004797 filed on Feb. 8, 2022 the contents of which are incorporated herein.

TECHNICAL FIELD

The present disclosure relates to an on-vehicle shutoff control device.

BACKGROUND

JP 2007-236061 A discloses an overcurrent prevention device. In the overcurrent prevention device disclosed in JP 2007-236061 A, an FET is provided in a current path along which current is supplied to a device to be protected. When the current detected by a current detection unit exceeds a predetermined value, a gate control unit turns off the FET for a predetermined period of time and then turns it on, and when the number of times the FET is turned on and off within a predetermined time exceeds a certain value, the gate control unit continuously keeps the FET in the off state.

The overcurrent prevention device disclosed in JP 2007-236061 A switches a switch provided in the current path to an on state to allow current to flow through the switch, and then determines whether overcurrent is occurring, and the overcurrent prevention device needs to allow the current to flow through the switch in order to make an overcurrent determination. With this method, when making the overcurrent determination under a condition in which an overcurrent is flowing (such as when a short circuit occurs in a load), since the excessive current flows every time the switch is turned on, it is inevitable that the excessive current will flow multiple times before a continuous protective operation (such as continuous shutoff of the switch) is performed.

The present disclosure relates to an on-vehicle shutoff control device capable of performing a protective operation to cut off a conductive path forming a power path, and one object of the present disclosure is to provide a technology capable of determining whether a continuous overcurrent state is occurring in the conductive path while also suppressing the energization period.

SUMMARY

An on-vehicle shutoff control device according to an aspect of the present disclosure is an on-vehicle shutoff control device for controlling an on-vehicle shutoff device including a conductive path forming a power path and a switch unit that switches between an off state of cutting off energization of the conductive path and an on state of allowing energization of the conductive path, the on-vehicle shutoff control device including:

- a current detection unit configured to detect a value of current flowing through the conductive path; and
- a control unit configured to switch the switch unit between the off state and the on state,
- wherein the control unit switches the switch unit from the on state to the off state in a case where the switch unit is in the on state and a current value detected by the current detection unit changes from less than a threshold value to the threshold value or more, and switches the switch unit to the on state in a case where the switch unit has remained in the off state and a potential difference across the switch unit has been continuously maintained less than a reference for a predetermined period of time after switching the switch unit from the on state to the off state.

An on-vehicle shutoff control device according to another aspect of the present disclosure is an on-vehicle shutoff control device for controlling an on-vehicle shutoff device including a conductive path forming a power path and a switch unit that switches between an off state of cutting off energization of the conductive path and an on state of allowing energization of the conductive path, the on-vehicle shutoff control device including:

- a current detection unit configured to detect a value of current flowing through the conductive path; and
- a control unit configured to switch the switch unit between the off state and the on state,
- wherein the control unit switches the switch unit from the on state to the off state in a case where the switch unit is in the on state and a current value detected by the current detection unit changes from less than a threshold value to the threshold value or more, and switches the switch unit to the on state in at least one of a case where a speed of increase of a potential difference across the switch unit after switching the switch unit from the on state to the off state is less than a reference, and a case where the potential difference across the switch unit is less than a reference at a time when a predetermined period of time passes after switching the switch unit from the on state to the off state.

Advantageous Effects

The technology according to the present disclosure relates to an on-vehicle shutoff control device capable of performing a protective operation to cut off a conductive path forming a power path, and can determine whether a continuous overcurrent state is occurring in the conductive path while also suppressing the energization period.

DETAILED DESCRIPTION OF PREFERRED EMBODIMENTS

Figure 1:
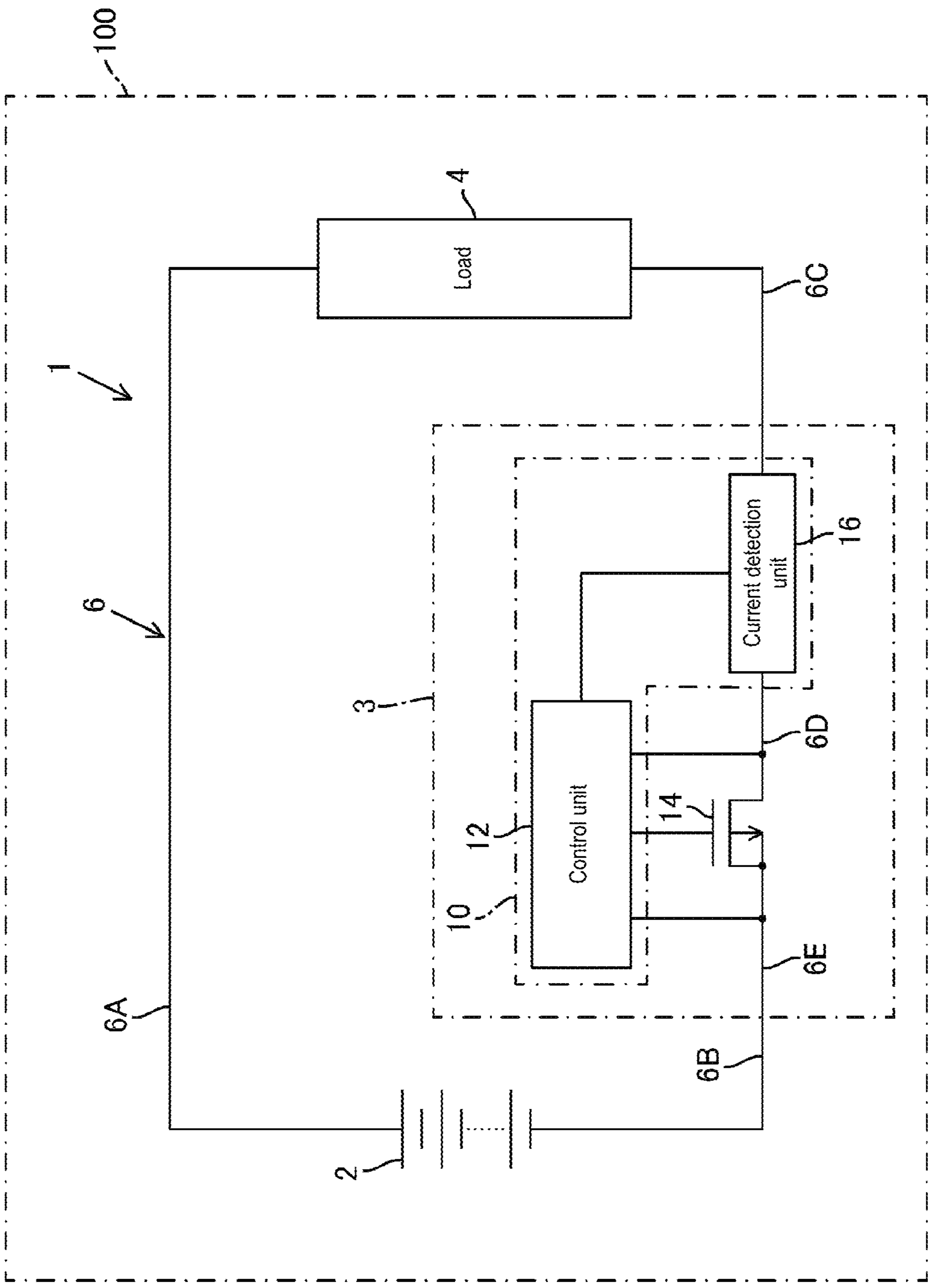
FIG. 1 is a block diagram schematically illustrating an on-vehicle system including an on-vehicle shutoff control device according to a first embodiment.

Hereinafter, embodiments of the disclosure are listed and illustrated. Note that the features illustrated below may be combined in any way as long as no contradiction arises.

In a first aspect, an on-vehicle shutoff control device for controlling an on-vehicle shutoff device including a conductive path forming a power path and a switch unit that switches between an off state of cutting off energization of the conductive path and an on state of allowing energization of the conductive path, the on-vehicle shutoff control device including:

a current detection unit configured to detect a value of current flowing through the conductive path; and a control unit configured to switch the switch unit between the off state and the on state, wherein the control unit switches the switch unit from the on state to the off state in a case where the switch unit is in the on state and a current value detected by the current detection unit changes from less than a threshold value to the threshold value or more, and switches the switch unit to the on state in a case where the switch unit has remained in the off state and a potential difference across the switch unit has been continuously maintained less than a reference for a predetermined period of time after switching the switch unit from the on state to the off state.

The on-vehicle shutoff control device of the first aspect can provide protection at an earlier time by switching the switch unit to the off state when the current value changes from less than the threshold value to the threshold value or more. Thereafter, the on-vehicle shutoff control device can return the switch unit to the on state when the switch unit has remained in the off state and the potential difference across the switch unit has been continuously maintained less than the reference for the predetermined period of time after switching the switch unit from the on state to the off state. If the switch unit has remained in the off state and the potential difference across the switch unit has been continuously maintained less than the reference for the predetermined period of time, there is a higher possibility of a temporary current increase caused by noise than when the potential difference across the switch unit changes to exceed the reference for the predetermined period of time. Therefore, if the on-vehicle shutoff control device operates so as to "return the switch to the on state in a case where the switch unit has remained in the off state and the potential difference across the switch unit has been continuously maintained less than the reference for the predetermined period of time", it is easy to properly return the switch unit to the on state.

In a second aspect the on-vehicle shutoff control device according to the first aspect, further including an energization circuit connected in parallel to the switch unit, wherein the energization circuit includes a current suppressing unit including a resistor unit having a resistance value greater than a resistance value of the switch unit when the switch unit is in the on state or including a constant current circuit through which a constant current lower than the threshold value flows, and is configured to switch between an energized state in which current flows from one side of the switch unit to the other side through the current suppressing unit and a stop state in which energization through the current suppressing unit is stopped, and the control unit switches the switch unit to the on state in a case where the switch unit has remained in the off state, the energization circuit has been maintained in the energized state, and the potential difference across the switch unit has been continuously maintained less than the reference for the predetermined period of time.

The on-vehicle shutoff control device of the second aspect can provide protection at an earlier time by switching the switch unit to the off state when the current value changes from less than the threshold value to the threshold value or more. Thereafter, the on-vehicle shutoff control device can determine whether the potential difference across the switch unit continues to be less than the reference for a predetermined period of time while maintaining the switch unit in the off state and allowing current to flow through the current suppressing unit using the energization circuit. In the case where the switch unit is in the off state and the energization circuit allows current to flow through the current suppressing unit, since suppressed current flows through the current suppressing unit, the on-vehicle shutoff control device can make the above determination based on results of such a suppressed current flowing. Through such determination, the on-vehicle shutoff control device can estimate whether there is a high possibility that a continuous overcurrent state is occurring in the conductive path (the conductive path forming the power path). Then, the on-vehicle shutoff control device can return the switch unit to the on state when it is estimated that possibility of the continuous overcurrent state occurring is low.

In a third aspect an on-vehicle shutoff control device for controlling an on-vehicle shutoff device including a conductive path forming a power path and a switch unit that switches between an off state of cutting off energization of the conductive path and an on state of allowing energization of the conductive path, the on-vehicle shutoff control device including:

a current detection unit configured to detect a value of current flowing through the conductive path; and a control unit configured to switch the switch unit between the off state and the on state, wherein the control unit switches the switch unit from the on state to the off state in a case where the switch unit is in the on state and a current value detected by the current detection unit changes from less than a threshold value to the threshold value or more, and switches the switch unit to the on state in at least one of a case where a speed of increase of a potential difference across the switch unit after switching the switch unit from the on state to the off state is less than a reference, and a case where the potential difference across the switch unit is less than a reference at a time when a predetermined period of time passes after switching the switch unit from the on state to the off state.

The on-vehicle shutoff control device of the third aspect can provide protection at an earlier time by switching the switch unit to the off state when the current value changes from less than the threshold value to the threshold value or more. Thereafter, the on-vehicle shutoff control device can determine whether there is a high possibility that a continuous overcurrent state is occurring in the conductive path (the conductive path forming the power path) while maintaining the switch unit in the off state.

For example, when the speed of increase of the potential difference across the switch unit after switching the switch unit from the on state to the off state is relatively high, compared to when the speed of increase is relatively low, there is a high possibility that the continuous overcurrent state is occurring in the conductive path forming the power path. Alternatively, when the potential difference across the switch unit is relatively small after switching the switch unit from the on state to the off state and passing of the predetermined period of time, compared to when the potential difference is relatively large, there is a high possibility that the continuous overcurrent state is occurring in the conductive path. Based on this idea, the on-vehicle shutoff control device determines whether there is a high possibility that the continuous overcurrent state is occurring in the conductive path while maintaining the switch unit in the off state, and when it is estimated that the possibility of the continuous overcurrent state occurring is low, the on-vehicle shutoff control device can return the switch unit to the on state.

In a fourth aspect the on-vehicle shutoff control device according to the third aspect, in which the control unit changes a voltage threshold value so that the voltage threshold value increases as time passes after switching the switch unit from the on state to the off state, and switches the switch unit to the on state in a case where the potential difference is less than the voltage threshold value after switching the switch unit from the on state to the off state.

The on-vehicle shutoff control device of [4] above can check, at an earlier time, whether the subsequent speed of increase of the potential difference is a slow speed equal to the reference or lower, when the switch unit is switched to the off state in response to the current value changing from less than the threshold value to the threshold value or more. Specifically, the voltage threshold value is set higher as time passes after the switch unit is switched to the off state, and when the speed of increase of the voltage threshold value in this case is taken as the reference, it is possible to check, at an earlier time, whether the speed of increase of the potential difference is slower than the speed of increase of the voltage threshold value.

The on-vehicle shutoff control device according to any one of the first through the fourth aspects, in which the conductive path is a power path to which power from a battery is supplied, and the control unit sets the reference lower the higher an output voltage of the battery is.

In the on-vehicle shutoff control device of such an aspect, the reference is set lower as the output voltage of the battery is higher, and thus the switch unit is less likely to return to the on state as the output voltage of the battery is higher, and the level of protection can be further raised. Since influence when an overcurrent occurs is larger as the output voltage of the battery is higher, if this method is adopted, it is easier to achieve an appropriate balance between protection and return.

The on-vehicle shutoff control device according to any one of the first through the fourth aspects, in which the control unit sets the reference lower the higher a temperature of the switch unit is.

In the on-vehicle shutoff control device of such an aspect, since the reference is set lower as the temperature of the switch unit is higher, the switch unit is less likely to return to the on state as the temperature of the switch unit is higher, and the level of protection can be further raised.

First Embodiment

Overview of On-Vehicle System 1

FIG. 1 shows an on-vehicle system 1 including an on-vehicle shutoff control device 10 according to a first embodiment. The on-vehicle system 1 is a system provided in a vehicle 100, and is a system that can supply power to an on-vehicle load 4. The vehicle 100 in which the on-vehicle system 1 is provided is, for example, a vehicle such as an electric vehicle, a plug-in hybrid vehicle, or a hybrid vehicle, or may be another type of vehicle. In FIG. 1, a region corresponding to the vehicle 100 is conceptually illustrated by a dashed-dotted line frame.

The on-vehicle system 1 includes a battery 2, a conductive path 6, a load 4, an on-vehicle shutoff device 3, and the like. In the following description, the on-vehicle load 4 will also be referred to as the load 4. The on-vehicle shutoff device 3 will also be referred to as a shutoff device 3. The on-vehicle shutoff control device 10 will also be referred to as a shutoff control device 10.

The battery 2 is an on-vehicle storage battery, and may be configured by a secondary battery such as a lead storage battery or a lithium ion battery, or may be configured by another type of storage battery. The battery 2 may be, for example, an auxiliary battery that applies a predetermined DC voltage (for example, 12 V) between conductive paths 6A and 6B when fully charged, or may be a high-voltage battery that outputs a voltage higher than 12 V.

The load 4 is an on-vehicle electrical device. The load 4 may be a starter motor, an alternator, a radiator cooling fan, or the like, may be an electric power steering system, an electric parking brake, lighting, a wiper drive unit, a navigation device, or the like, or may be any other device.

The conductive path 6 is a conductive path forming the power path. The conductive path 6 is a conductive path through which power supplied from the battery 2 is transmitted, and is a conductive path forming a path for supplying power to the load 4. In the conductive path 6, the conductive path between the load 4 and a positive electrode of the battery 2 is the conductive path 6A. In the conductive path 6, the conductive path electrically connected to a negative electrode of the battery 2 is the conductive path 6B. In the conductive path 6, the conductive path between the load 4 and the shutoff device 3 is a conductive path 6C. In the conductive path 6, conductive paths 6D and 6E are conductive paths forming parts of the shutoff device 3. An output voltage corresponding to a potential difference between the electrodes of the battery 2 is applied between the conductive path 6A and the conductive path 6B. When a switch unit 14 is in the on state, current flows to the load 4 through the conductive path 6 based on the power supplied from the battery 2.

Shutoff Device Configuration

The shutoff device 3 is a device for cutting off the conductive path 6. The shutoff device 3 includes the switch unit 14, a current detection unit 16, and a control unit 12.

The switch unit 14 includes a semiconductor switch such as a field effect transistor (FET), a mechanical relay, or the like. The switch unit 14 switches between the off state of cutting off energization of the conductive path 6 and the on state of allowing energization of the conductive path 6. The switch unit 14 may include one element, or may include a plurality of elements.

In a representative example described below, the switch unit 14 is an FET as shown in FIG. 1. The switch unit 14 is in the on state when the control unit 12 outputs an on signal, and is in the off state when the control unit 12 outputs an off signal. When the switch unit 14 is in the off state, the flow of power from the conductive path 6D to the conductive path 6E through the switch unit 14 is cut off, and when the switch unit 14 is in the on state, the flow of power from the conductive path 6D to the conductive path 6E through the switch unit 14 is allowed. When the switch unit 14 is in the on state, the flow of power in both directions through the switch unit 14 may be allowed, and when the switch unit 14 is in the off state, the flow of power in both directions through the switch unit 14 may be cut off.

The current detection unit 16 is a detection unit that detects the value of current flowing through the conductive path 6. "Detecting the value of current flowing through the conductive path 6" means outputting or obtaining a detected value that can specify the value of current flowing through the conductive path 6. In an example of FIG. 1, the current detection unit 16 is provided in the conductive path 6 and outputs the detected value indicating the value of current flowing through a part where the current detection unit 16 is provided. For example, the current detection unit 16 substantially detects the value of current flowing through itself by generating and outputting a voltage value corresponding to a value of current flowing between the conductive path 6C and the conductive path 6D, and transmits the voltage value to the control unit 12. The current detection unit 16 is constituted by a known current sensor, and there is no limitation on the type of current sensor.

The control unit 12 may have an information processing device including an MPU or the like, or may be configured by a hardware circuit. The control unit 12 may include a storage unit such as a semiconductor memory. The control unit 12 has functions of performing various calculations and information processing, and also has functions of receiving and outputting signals.

In the example of FIG. 1, the conductive path 6C is a conductive path between the load 4 and the current detection unit 16, and is a conductive path that can short-circuit between the load 4 and the current detection unit 16. The conductive path 6D is a conductive path between the current detection unit 16 and one end of the switch unit 14, and is a conductive path that can short-circuit the one end of the switch unit 14 and the current detection unit 16. The conductive path 6E is a conductive path between the other end of the switch unit 14 and the conductive path 6B, and is a conductive path that can short-circuit between the other end of the switch unit 14 and the conductive path 6B.

Operation of Shutoff Control Device

Figure 2:
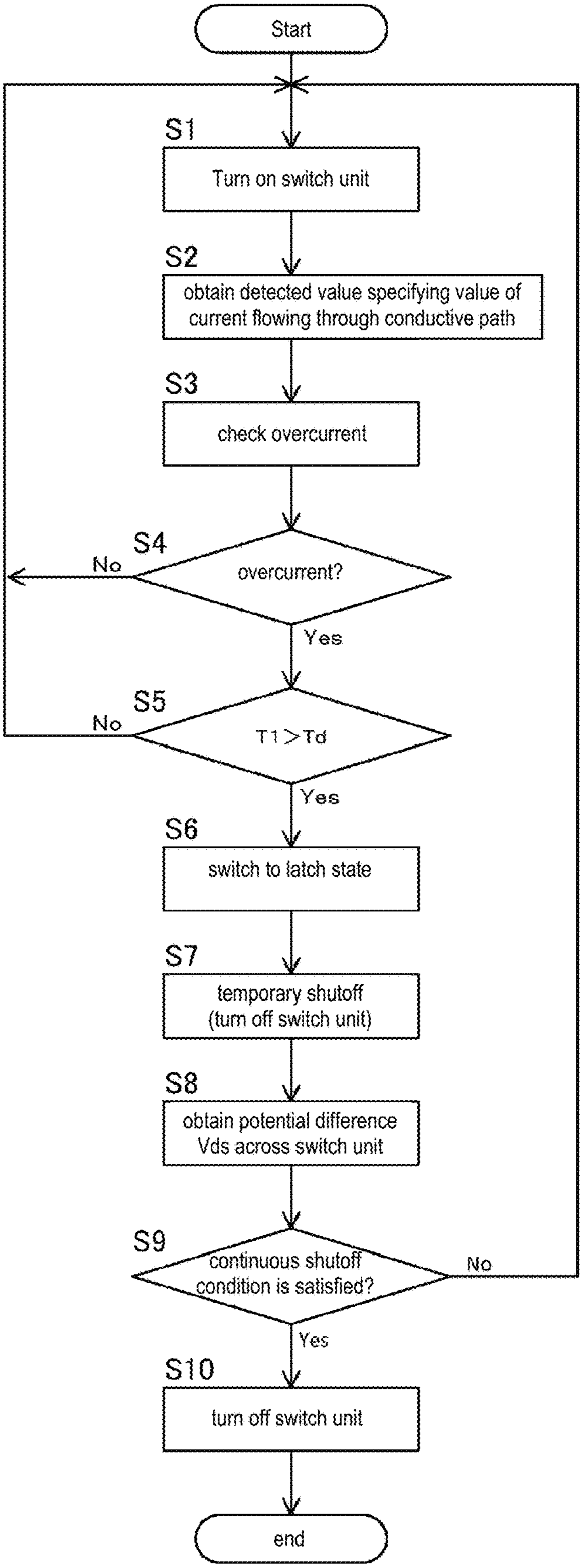
FIG. 2 is a flowchart illustrating a flow of shutoff control performed by the on-vehicle shutoff control device according to the first embodiment.

The control unit 12 starts shutoff control shown in FIG. 2 when a predetermined start condition is satisfied, and ends the shutoff control when a predetermined end condition is satisfied. In the present embodiment, the period from when the start condition is satisfied until the end condition is satisfied is the shutoff control period. The predetermined start condition may be that a starting switch of the vehicle 100 is switched from an off state to an on state, may be that the supply of power to the control unit 12 is started, or may be any other start condition. The predetermined end condition may be that step S10 ends, may be that the starting switch of the vehicle 100 switches from the on state to the off state, or may be that the supply of power to the control unit 12 is stopped, or may be any other end condition.

When the start condition is satisfied, the control unit 12 performs the operation of step S1 in FIG. 2 and switches the switch unit 14 to the on state. Note that the switch unit 14 is maintained in the off state while not in the shutoff control period.

After step S1, the control unit 12 checks in step S2 a detected value Vr received from the current detection unit 16. After step S2, the control unit 12 checks in step S3 whether overcurrent is occurring based on the detected value Vr checked in step S2. In step S3, the control unit 12 compares, for example, a current value Ir (the value of current flowing through the position of the current detection unit 16 in the conductive path 6) specified by the detected value Vr with a threshold value Ith that is a reference for overcurrent. Note that comparison in step S3 may be performed by comparing the detected value (output voltage value of the current detection unit 16) Vr for specifying the current value Ir with a voltage threshold value Vth corresponding to the threshold value Ith.

After step S3, the control unit 12 determines in step S4 whether the current value Ir specified by the detected value Vr is less than the threshold value Ith. If the control unit 12 determines in step S4 that the current value Ir is less than the threshold value Ith, the control unit 12 returns to step S1 and performs the processing from step S1 onwards again. If the control unit 12 determines in step S4 that the current value Ir is the threshold value Ith or more, the control unit 12 moves to step S5. Note that when making the determination in step S4, the control unit 12 may determine No in step S4 if the detected value Vr is less than the voltage threshold value Vth, and may determine Yes in step S4 if the detected value Vr is the voltage threshold value Vth or more.

When the processing proceeds to step S5, the control unit 12 determines in step S5 whether an elapsed time T1 since the determination of Yes in step S4 (the elapsed time since the determination that the current value Ir is the threshold value Ith or more in step S4) exceeds a reference time Td. If the control unit 12 determines in step S5 that the elapsed time T1 does not exceed the reference time Td, the control unit 12 returns to step S1 and performs the processing from step S1 onwards again. If the control unit 12 determines in step S5 that the elapsed time T1 exceeds the reference time Td, the control unit 12 moves to step S6 and latches the overcurrent state. In step S6, a latch state may be continued by continuously outputting a latch signal by a latch circuit, or the latch state may be continued by the information processing device. When the control unit 12 switches to the latch state in step S6, the control unit 12 switches the switch unit 14 from the on state to the off state in step S7. In the present embodiment, the switch unit 14 is in the off state while the latch state is maintained.

Figure 3:
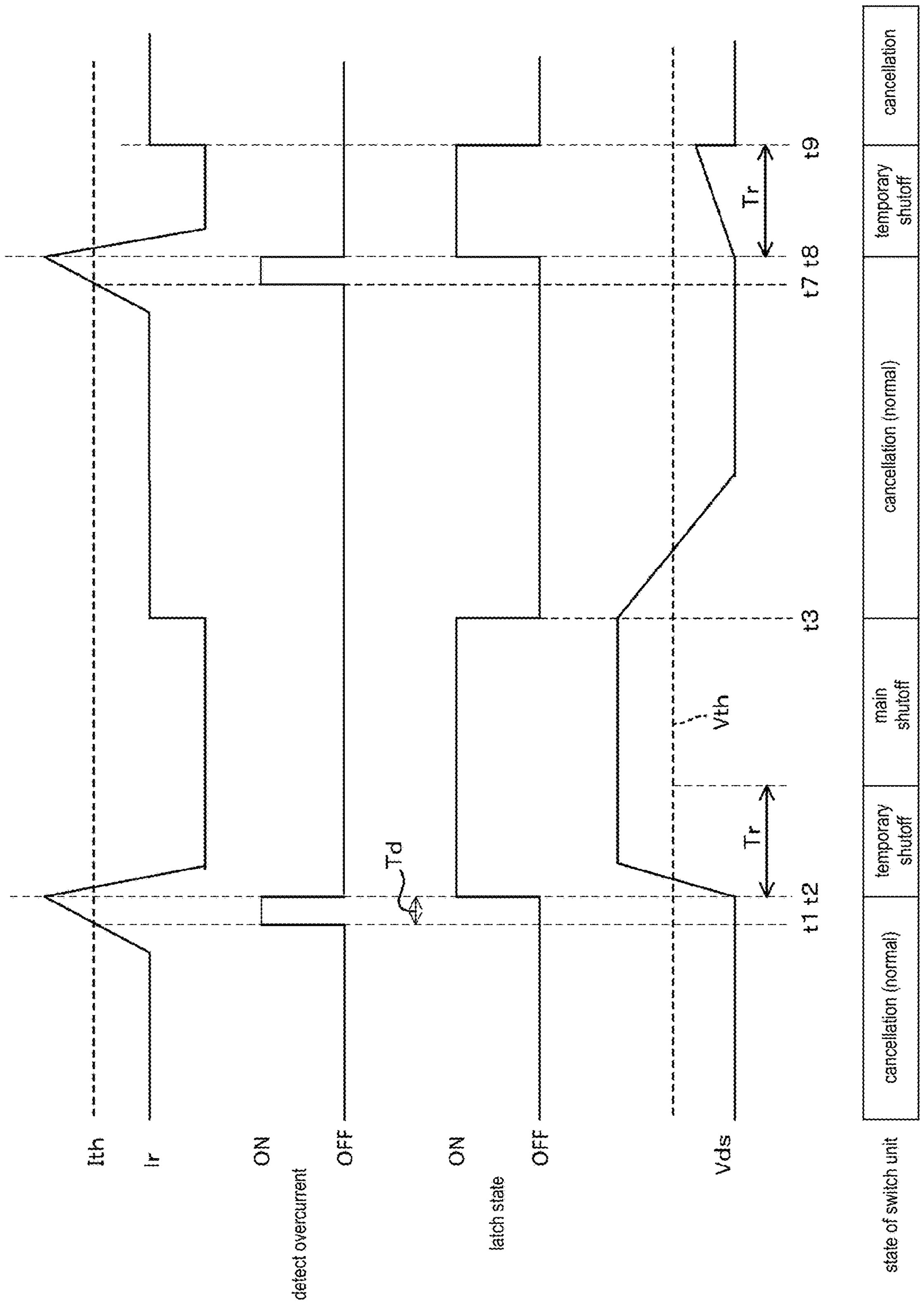
FIG. 3 is a timing chart illustrating changes in current flowing through a conductive path, a state of overcurrent detection, a latch state, a potential difference across a switch unit, and a state of the switch unit in an on-vehicle system to which the on-vehicle shutoff control device according to the first embodiment is applied.

In this way, the control unit 12 switches the switch unit 14 from the on state to the off state for protection when the switch unit 14 is in the on state during the shutoff control and the current value Ir detected by the current detection unit 16 changes from less than the threshold value Ith to the threshold value Ith or more. On the other hand, when the current value Ir detected by the current detection unit 16 during the shutoff control is less than the threshold value Ith, the control unit 12 maintains the switch unit 14 in the on state. Specifically, as shown in FIG. 3, an overcurrent detection period starts from a time point when the current value Ir is the threshold value Ith or more (a time (time point) t1 or t7 in FIG. 3), and a latch state period starts from a time point when a length (the elapsed time T1) of the overcurrent detection period exceeds the time Td (a time (time point) t2 or t8 in FIG. 3). In FIG. 3, during a period when "overcurrent detection" is ON (the overcurrent detection period), an overcurrent detection circuit (not shown) may output a detection signal, and during a period when "overcurrent detection" is OFF (a detection cancellation period), the overcurrent detection circuit (not shown) may output a detection cancellation signal. Alternatively, instead of these operations, the control unit 12 may specify the overcurrent detection period and the detection cancellation period by information processing. In FIG. 3, the latch circuit (not shown) may output the latch signal during a period when the "latch state" is ON (a latch period), and the latch circuit (not shown) may output a latch cancellation signal during a period when the "latch state" is OFF (a latch cancellation period). Alternatively, instead of these operations, the control unit 12 may specify the latch period and the latch cancellation period by information processing.

After step S7, the control unit 12 acquires a potential difference Vds across (voltage across) the switch unit 14 in step S8. The potential at one end and the potential at the other end of the switch unit 14 are input to the control unit 12, and the control unit 12 detects the potential difference Vds across the switch unit 14 based on the difference between these potentials.

After step S8, the control unit 12 determines whether a continuous shutoff condition is satisfied in step S9. The continuous shutoff condition in the present embodiment is that "during a predetermined time Tr after the switch unit 14 is switched from the on state to the off state, the switch unit 14 remains in the off state and the potential difference Vds across the switch unit 14 is the reference (voltage threshold value Vth) or more". A continuous shutoff cancellation condition of the present embodiment is that "during the predetermined time Tr, the switch unit 14 remains in the off state and the potential difference Vds across the switch unit 14 is continuously maintained less than the reference (voltage threshold value Vth)". The predetermined time Tr is a period from a time point when the switch unit 14 is switched from the on state to the off state (a time (time point) t2 or t8 in FIG. 3) until a predetermined time period elapses.

If the control unit 12 determines in step S9 that the switch unit 14 has remained in the off state and the potential difference Vds across the switch unit 14 has been the reference (voltage threshold value Vth) or more during the predetermined time Tr, the control unit 12 moves to step S10 and maintains the switch unit 14 in the off state. In FIG. 3, an off period of the switch unit 14 after the control unit 12 moves to step S10 is defined as a "main shutoff" period. When the control unit 12 moves to step S10 and maintains the switch unit 14 in the off state, the control unit 12 maintains the latch state until a latch cancellation condition (for example, the above-mentioned start condition or the above-mentioned end condition) is satisfied, and cancels the latch state when the latch cancellation condition is satisfied. The example of FIG. 3 is an example in which the latch cancellation condition is satisfied at time t3.

If the control unit 12 determines in step S9 that the switch unit 14 has remained in the off state and the potential difference Vds across the switch unit 14 has been continuously maintained less than the reference (voltage threshold value Vth) during the predetermined time Tr, the control unit 12 returns to step S1 and switches the switch unit 14 to the on state. Note that when the control unit 12 returns to step S1, the control unit 12 cancels the latch state until the above-mentioned latch period starts. Since such an operation is performed, the switch unit 14 can be returned to the on state at an earlier time.

Example of Effects

The shutoff control device 10 can provide protection at an earlier time by switching the switch unit 14 to the off state when the value Ir of the current flowing through the conductive path 6 changes from less than the threshold value Ith to the threshold value Ith or more. Thereafter, the shutoff control device 10 can determine whether there is a high possibility that the continuous overcurrent state is occurring in the conductive path 6 (the conductive path forming the power path) while maintaining the switch unit 14 in the off state.

The shutoff control device 10 can return the switch unit 14 to the on state in a situation (for example, the situation after time t9 in FIG. 3) where the switch unit 14 has remained in the off state and the potential difference Vds across the switch unit 14 has been continuously maintained less than the reference (voltage threshold value Vth) during the predetermined time Tr after switching the switch unit 14 from the on state to the off state. If the switch unit 14 has remained in the off state and the potential difference Vds across the switch unit 14 has been continuously maintained less than the reference (voltage threshold value Vth) during the predetermined time Tr as after time t9 in FIG. 3, there is a higher possibility of a temporary current increase caused by noise than when the potential difference Vds across the switch unit 14 changes to exceed the reference in the predetermined time Tr like a period after time t2 in FIG. 3. Therefore, by operating as described above, it is easy to properly return the switch unit 14 to the on state.

Second Embodiment

The following description relates to a second embodiment.

The device configuration of a representative example of the second embodiment is the same as the on-vehicle shutoff control device 10 shown in FIG. 1. Therefore, the representative example of the second embodiment will be described below with reference to FIG. 1. The representative example of the second embodiment described below is different from the first embodiment only in the specific content of the determination method in step S9 of FIG. 2, and is otherwise the same as the first embodiment. Therefore, the content of step S9 in FIG. 2 will be mainly described below. Since the content of FIGS. 1 and 2 is the same between the first embodiment and the second embodiment, FIGS. 1 and 2 will be referred to in the following description.

In the second embodiment as well, the control unit 12 starts the shutoff control shown in FIG. 2 when the above-mentioned start condition is satisfied, and performs the shutoff control until the above-mentioned end condition is satisfied. The processing in steps S1 to S8 in the shutoff control is the same as in the first embodiment. After step S8, the control unit 12 determines whether the continuous shutoff condition is satisfied in step S9.

Figure 4:
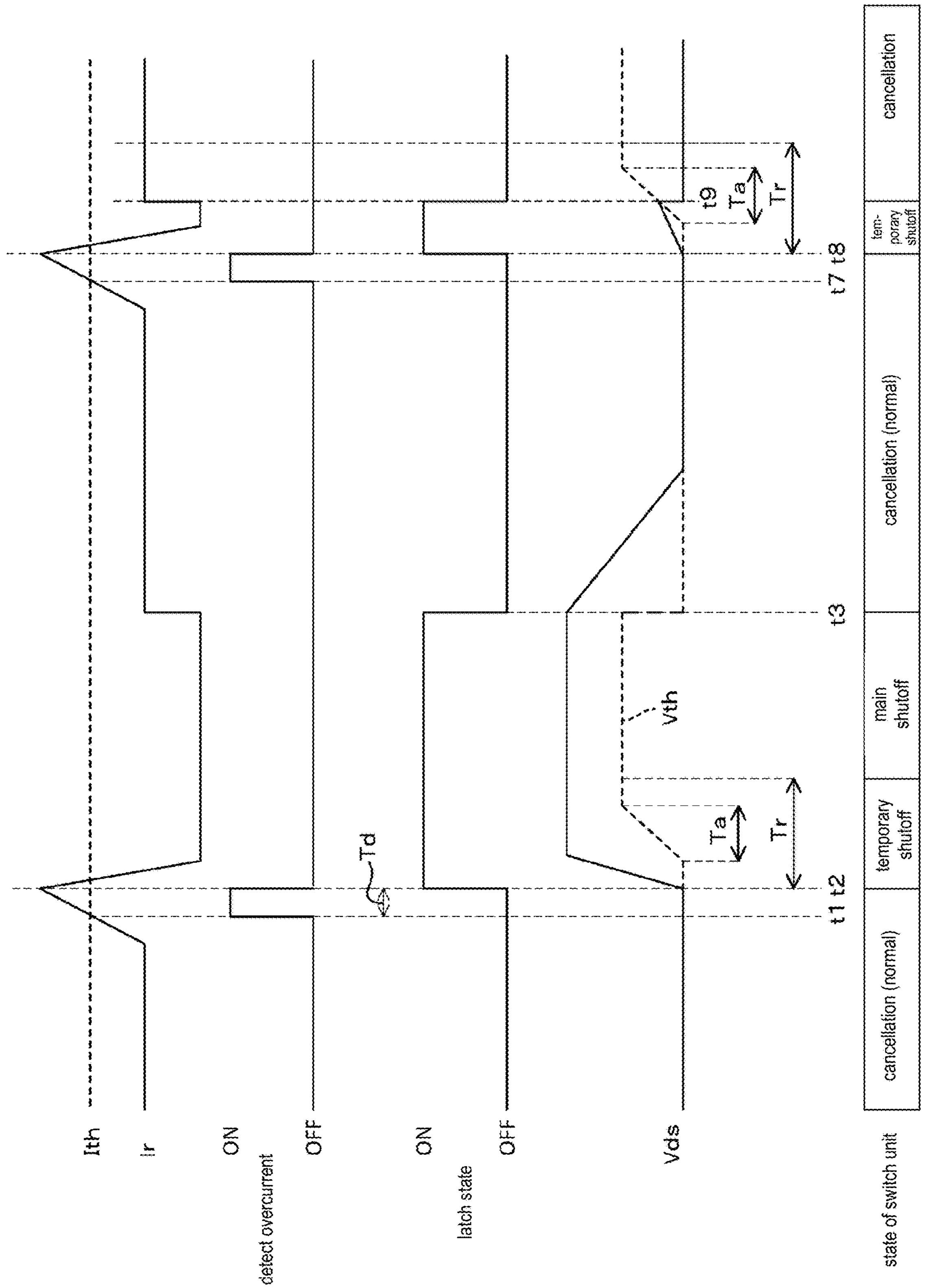
FIG. 4 is a timing chart illustrating changes in current flowing through a conductive path, a state of overcurrent detection, a latch state, a potential difference across a switch unit, and a state of the switch unit in an on-vehicle system to which the on-vehicle shutoff control device according to a second embodiment is applied.

The continuous shutoff condition in the present embodiment is that "the speed of increase of the potential difference across the switch unit 14 exceeds a reference (a reference speed of increase) in the predetermined time Tr immediately after the switch unit 14 is cut off". The continuous shutoff cancellation condition is that "the speed of increase of the potential difference across the switch unit 14 in the predetermined time Tr is less than the reference (the reference speed of increase)". The predetermined time Tr is a period from a time point when the switch unit 14 is switched from the on state to the off state (a time (time point) t2 or t8 in FIG. 4) until a predetermined time period elapses.

The control unit 12 can determine whether the speed of increase of the potential difference Vds across the switch unit 14 in the predetermined time Tr is less than the reference by the following method. The control unit 12 changes the voltage threshold value Vth so as to increase the voltage threshold value (a cancellation threshold value) Vth as time passes from a time point when the switch unit 14 is switched from the on state to the off state (a time (time point) t2 or t8 in FIG. 3) by operations in steps S6 and S7. Specifically, the control unit 12 sets the voltage threshold value Vth so as to maintain Vth at 0 for a certain period of time from a time point when the switch unit 14 is switched from the on state to the off state (a time (time point) t2 or t8 in FIG. 3). The control unit 12 increases Vth to a certain value Va at a predetermined speed of increase (a reference speed) from the time when the certain period of time has elapsed, and then maintains the voltage threshold value Vth at the certain value Va until the latch cancellation condition is satisfied. The certain value Va is, for example, a value larger than 0 and smaller than the output voltage when the battery 2 is fully charged. The reference speed only needs to be set according to characteristics of the circuit. A period Ta in which the voltage threshold value Vth is gradually increased at the reference speed is a part of a period from a time when the control unit 12 switches the switch unit 14 from the on state to the off state until the predetermined time Tr elapses. In an example of FIG. 4, when the length of the period Ta is T1, the reference speed is a speed of increase that linearly increases the voltage by Va/T1 per unit time.

In this way, after switching the switch unit 14 from the on state to the off state (after the latch period starts), the control unit 12 changes the voltage threshold value Vth in the predetermined time Tr using the method described above, and in step S9, the control unit 12 determines whether the potential difference Vds is less than the voltage threshold value Vth during the predetermined time Tr. If the control unit 12 determines in step S9 that the potential difference Vds is less than the voltage threshold value Vth during the predetermined time Tr (that is, if the control unit 12 determines that the speed of increase of the potential difference Vds in the predetermined time Tr is less than the reference speed), the control unit 12 returns to step S1 and switches the switch unit 14 to the on state. When the control unit 12 returns to step S1, the control unit 12 cancels the latch state until the above-mentioned latch period starts. Since such an operation is performed, the switch unit 14 can be returned to the on state at an earlier time.

On the other hand, if the control unit 12 determines that the potential difference Vds has been maintained at or above the voltage threshold value Vth during the predetermined time Tr after switching the switch unit 14 from the on state to the off state (after the latch period starts) (that is, if the control unit 12 determines that the speed of increase of the potential difference Vds in the predetermined time Tr is the reference speed or more), the control unit 12 moves to step S10 and maintains the switch unit 14 in the off state. When the control unit 12 moves to step S10 and maintains the switch unit 14 in the off state, the control unit 12 maintains the latch state until the latch cancellation condition (for example, the above-mentioned start condition or the above-mentioned end condition) is satisfied, and cancels the latch state when the latch cancellation condition is satisfied.

For example, when the speed of increase of the potential difference Vds across the switch unit 14 after switching the switch unit 14 from the on state to the off state is relatively high, there is a higher possibility that the continuous overcurrent state is occurring in the conductive path 6 compared to when the speed of increase is relatively low. Based on this idea, the shutoff control device 10 of the second embodiment determines whether there is a high possibility that the continuous overcurrent state is occurring in the conductive path 6 while maintaining the switch unit 14 in the off state, and when it is estimated that the possibility of the continuous overcurrent state occurring is low, the shutoff control device 10 can return the switch unit 14 to the on state.

When the switch unit 14 is switched to the off state in response to the current value Ir changing from less than the threshold value Ith to the threshold value Ith or more, the shutoff control device 10 employs the method of changing the voltage threshold value Vth as described above, and further employs the method of comparing the voltage threshold value Vth and the potential difference Vds, and thus whether the speed of increase of the potential difference Vds is a slow speed equal to the reference or lower can be checked at an earlier time.

Third Embodiment

The following description relates to a third embodiment.

The device configuration of a representative example of the third embodiment is the same as the on-vehicle shutoff control device 10 shown in FIG. 1. Therefore, the representative example of the third embodiment will be described below with reference to FIG. 1. The representative example of the third embodiment described below is different from the first embodiment only in the specific content of the determination method in step S9 of FIG. 2, and is otherwise the same as the first embodiment. Therefore, the content of step S9 in FIG. 2 will be mainly described. Since the content of FIGS. 1 to 3 is the same between the first embodiment and the third embodiment, FIGS. 1 to 3 will be referred to in the following description.

In the third embodiment as well, the control unit 12 starts the shutoff control shown in FIG. 2 when the above-mentioned start condition is satisfied, and performs the shutoff control until the above-mentioned end condition is satisfied. In this shutoff control, the processing in steps S1 to S8 is the same as in the first embodiment. After step S8, the control unit 12 determines whether the continuous shutoff condition is satisfied in step S9.

The continuous shutoff condition in the present embodiment is that "the potential difference Vds across the switch unit 14 is the reference (voltage threshold value Vth) or more at a time when the predetermined time Tr elapses after switching the switch unit 14 from the on state to the off state". The continuous shutoff cancellation condition is that "the potential difference Vds across the switch unit 14 is less than the reference (voltage threshold value Vth) at the time when the predetermined time Tr elapses after switching the switch unit 14 from the on state to the off state". The length of the predetermined time Tr is a predetermined length.

If the control unit 12 determines in step S9 that the potential difference Vds across the switch unit 14 at the time when the predetermined time Tr elapses is the reference (voltage threshold value Vth) or more, the control unit 12 moves to step S10 and maintains the switch unit 14 in the off state.

If the control unit 12 determines in step S9 that the potential difference Vds across the switch unit 14 at the time when the predetermined time Tr elapses is less than the reference (voltage threshold value Vth), the control unit 12 returns to step S1 and switches the switch unit 14 to the on state. When the control unit 12 returns to step S1, the control unit 12 cancels the latch state until the above-mentioned latch period starts. Since such an operation is performed, the switch unit 14 can be returned to the on state at an earlier time.

Fourth Embodiment

The following description relates to a fourth embodiment.

The device configuration of a representative example of the fourth embodiment includes all configurations of the on-vehicle shutoff control device 10 shown in FIG. 1, and additional features. Therefore, the representative example of the fourth embodiment will be described below with reference to FIG. 1, and the configuration and the like in the control unit 12 will be described with reference to FIG. 5. In the representative example of the fourth embodiment described below, the flow of the shutoff control is the same as that in FIG. 2, and therefore FIG. 2 will be referred to in the following description.

Figure 5:
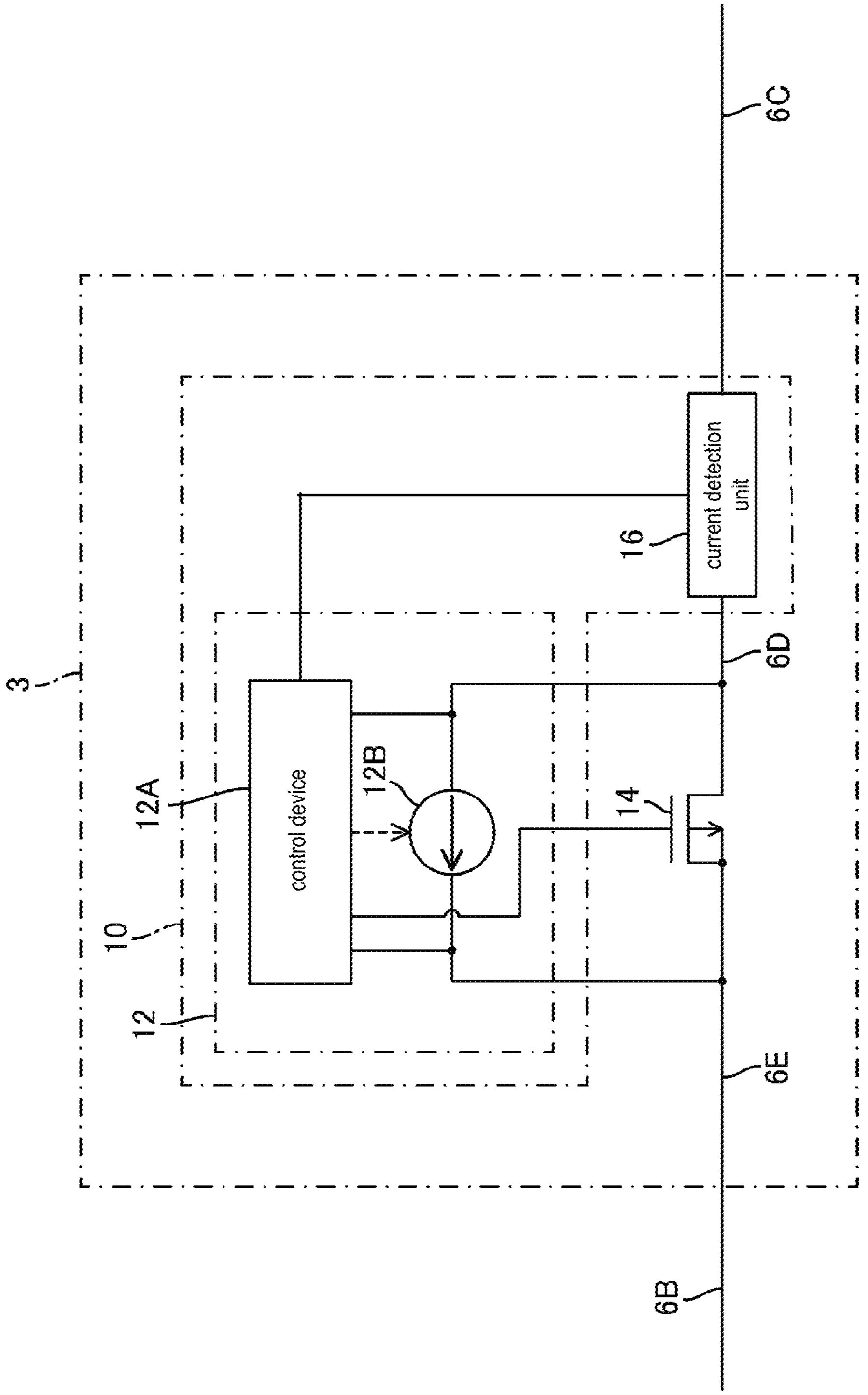
FIG. 5 is a block diagram illustrating an internal configuration and the like of a control unit in the on-vehicle shutoff control device according to a fourth embodiment.

The shutoff control device 10 according to the representative example of the fourth embodiment has a configuration as shown in FIG. 1. Further, as shown in FIG. 5, the control unit 12 includes a control device 12A having the same configuration and functions as the control unit 12 of the first embodiment, and a constant current circuit 12B that is an example of the energization circuit. As shown in FIG. 5, the constant current circuit 12B is connected in parallel to the switch unit 14 between the conductive path 6D and the conductive path 6E. The constant current circuit 12B corresponds to an example of the current suppressing unit. The constant current circuit 12B is a circuit through which a constant current having a value lower than the above-mentioned threshold value Ith flows. When an operation instruction is received from the control device 12A, the constant current circuit 12B remains in the energized state until a stop instruction is subsequently received from the control device 12A, and in this energized state, the constant current circuit 12B operates to allow the constant current to flow from the conductive path 6D on one side of the switch unit 14 to the conductive path 6E on the other side of the switch unit 14 through the constant current circuit 12B. When the stop instruction is received from the control device 12A, the constant current circuit 12B remains in a stop state until the operation instruction is subsequently received from the control device 12A, and stops the flow of power through itself in this stop state.

In the fourth embodiment as well, the control unit 12 starts the shutoff control shown in FIG. 2 when the above-mentioned start condition is satisfied, and performs the shutoff control until the above-mentioned end condition is satisfied. In this shutoff control, the processing in steps S1 to S8 and S10 is the same as in the After step S8, the control unit 12 determines whether the first embodiment. continuous shutoff condition is satisfied in step S9.

Figure 6:
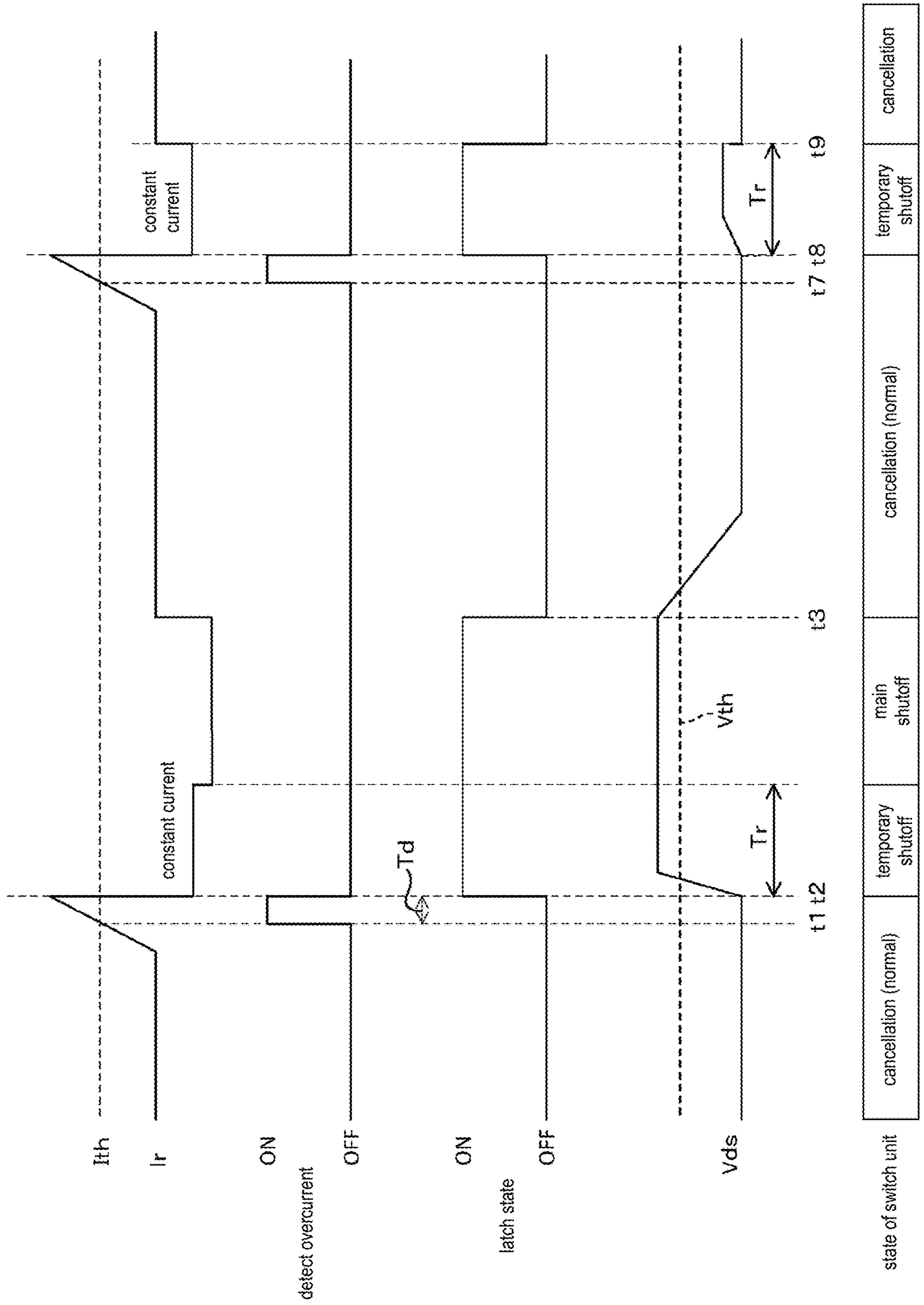
FIG. 6 is a timing chart illustrating changes in current flowing through a conductive path, a state of overcurrent detection, a latch state, a potential difference across a switch unit, and a state of the switch unit in an on-vehicle system to which the on-vehicle shutoff control device according to the fourth embodiment is applied.

In step S9, the control unit 12 transmits the operation instruction to the constant current circuit 12B, and continuously maintains the constant current circuit 12B in the energized state during the predetermined time Tr as shown in FIG. 6. The continuous shutoff condition in the present embodiment is that "the switch unit 14 remains in the off state and the potential difference Vds across the switch unit 14 is the reference (voltage threshold value Vth) or more during the predetermined time Tr". The continuous shutoff cancellation condition of the present embodiment is that "the switch unit 14 remains in the off state and the potential difference Vds across the switch unit 14 is continuously maintained less than the reference (voltage threshold value Vth) during the predetermined time Tr". The predetermined time Tr is a period from a time point when the switch unit 14 is switched from the on state to the off state (a time (time point) t2 or t8 in FIG. 6) until a predetermined time period elapses.

If the potential difference Vds is the reference (voltage threshold value Vth) or more in the predetermined time Tr, and the switch unit 14 continues in the off state from a start time of the predetermined time Tr until the potential difference Vds is the reference (voltage threshold value Vth) or more, the control unit 12 determines Yes in step S9, moves to step S10, and maintains the switch unit 14 in the off state.

If the constant current flows through the constant current circuit 12B during the predetermined time Tr in step S9, and the switch unit 14 remains in the off state and the potential difference Vds is continuously maintained less than the reference (voltage threshold value Vth) during the entirety of the predetermined time Tr, the control unit 12 determines No in step S9, returns to step S1, and changes the switch unit 14 to the on state. When the control unit 12 returns to step S1, the control unit 12 cancels the latch state until the latch period starts. Since such an operation is performed, the switch unit 14 can be returned to the on state at an earlier time.

Fifth Embodiment

The following description relates to a fifth embodiment.

The device configuration of a representative example of the fifth embodiment includes all the configurations of the on-vehicle shutoff control device 10 shown in FIG. 1, and additional features. Therefore, the representative example of the fifth embodiment will be described below with reference to FIG. 1, and the configuration and the like in the control unit 12 will be described with reference to FIG. 7. In the representative example of the fifth embodiment described below, the flow of the shutoff control is the same as that in FIG. 2, and therefore FIG. 2 will be referred to in the following description.

The shutoff control device 10 of the fifth embodiment has a configuration as shown in FIG. 8. In the shutoff control device 10 of the fifth embodiment, a current suppressing unit 12C is used instead of the constant current circuit 12B of the shutoff control device 10 of the fourth embodiment. The hardware configuration of the shutoff control device 10 in FIG. 7 is the same as the shutoff control device 10 (FIG. 5) of the fourth embodiment except that the current suppressing unit 12C is used instead of the constant current circuit 12B (FIG. 5), and the control device 12A controls the switching on/off of a switch 12D instead of the control device 12A controlling the operation of the constant current circuit 12B (FIG. 5).

Figure 7:
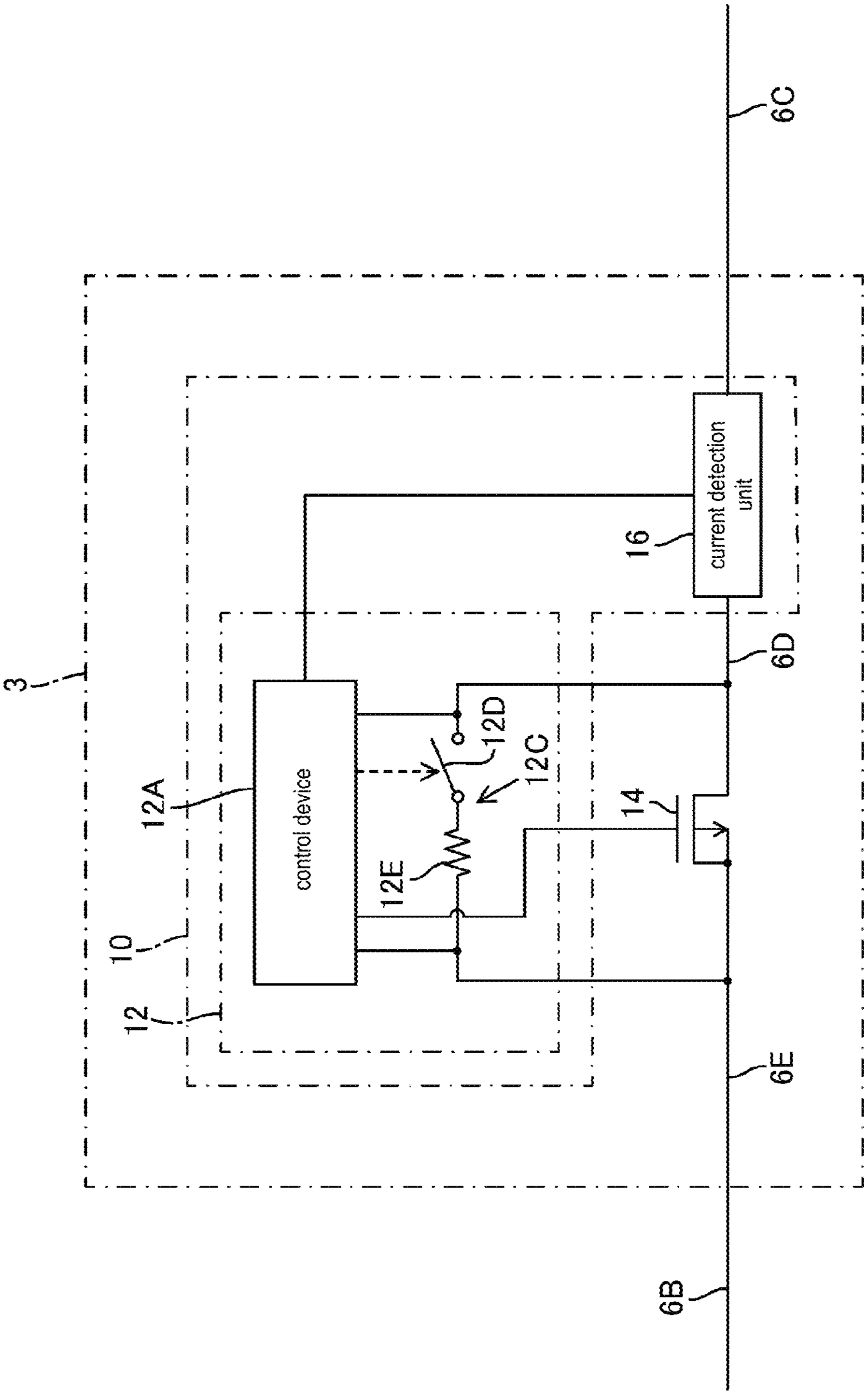
FIG. 7 is a block diagram illustrating the internal configuration and the like of the control unit in the on-vehicle shutoff control device according to a fifth embodiment.

As shown in FIG. 7, the current suppressing unit 12C includes a resistor unit 12E and the switch 12D. The resistance value of the resistor unit 12E is larger than the resistance value of the switch unit 14 when the switch unit 14 is in the on state. The switch 12D allows energization of the resistor unit 12E when the switch 12D is in the on state, and cuts off energization of the resistor unit 12E when the switch 12D is in the off state. In an example of FIG. 7, the switch 12D and the resistor unit 12E are connected in series. The current suppressing unit 12C corresponds to an example of the energization circuit, and switches between the energized state in which current flows from one side to the other side of the switch unit 14 through the current suppressing unit 12C, and a stop state in which energization through the current suppressing unit 12C is stopped.

In the fifth embodiment as well, the control unit 12 starts the shutoff control shown in FIG. 2 when the above-mentioned start condition is satisfied, and performs the shutoff control until the above-mentioned end condition is satisfied. In this shutoff control, the processing in steps S1 to S8 and S10 is the same as in the first embodiment. After step S8, the control unit 12 determines whether the continuous shutoff condition is satisfied in step S9.

In step S9, the control unit 12 gives an operation instruction to the current suppressing unit 12C (specifically gives an on instruction to the switch 12D), and continuously maintains the current suppressing unit 12C in the energized state during the predetermined time Tr. The continuous shutoff condition in the present embodiment is that "the switch unit 14 remains in the off state and the potential difference Vds across the switch unit 14 is the reference (voltage threshold value Vth) or more during the predetermined time Tr". The continuous shutoff cancellation condition of the present embodiment is that "the switch unit 14 remains in the off state and the potential difference Vds across the switch unit 14 is continuously maintained less than the reference (voltage threshold value Vth) during the predetermined time Tr". The predetermined time Tr is a period from when the switch unit 14 is switched from the on state to the off state until a predetermined time period elapses. When making the determination in step S9, if the potential difference Vds is the reference (voltage threshold value Vth) or more in the predetermined time Tr, and the switch unit 14 continues in the off state from the start time of the predetermined time Tr until the potential difference Vds is the reference (voltage threshold value Vth) or more, the control unit 12 determines Yes in step S9, moves to step S10, and maintains the switch unit 14 in the off state.

If the constant current flows through the constant current circuit 12B during the predetermined time Tr in step S9, and the switch unit 14 remains in the off state and the potential difference Vds is continuously maintained less than the reference (voltage threshold value Vth) during the entirety of the predetermined time Tr, the control unit 12 determines No in step S9, returns to step S1, and changes the switch unit 14 to the on state. When the control unit 12 returns to step S1, the control unit 12 cancels the latch state until the latch period starts. Since such an operation is performed, the switch unit 14 can be returned to the on state at an earlier time.

Other Embodiments

The present disclosure is not limited to the embodiments described above and illustrated in the drawings. For example, the features of the embodiments described above or below may be combined in any manner as long as no contradiction arises. Further, any feature of the embodiments described above or below may be omitted unless explicitly stated as essential. Furthermore, the embodiments described above may be modified as follows.

In any of the embodiments described above, the control unit 12 may adjust the reference so that the reference is lower the higher the output voltage of the battery 2 is. For example, in any of the first, third to fifth embodiments, instead of a method in which the voltage threshold value Vth is a fixed value, a method in which the output voltage of the battery 2 and the voltage threshold value Vth are defined in a negative proportional relationship may be used, a method in which the output voltage of the battery 2 and the voltage threshold value Vth are determined in inverse proportion may be used, or a method in which the voltage threshold value Vth is determined by another function that determines the voltage threshold value Vth to be lower the higher the output voltage of the battery 2 is may be used. Further, in the second embodiment, instead of a method in which the reference speed is a fixed value, a method in which the output voltage of the battery 2 and the reference speed are defined in a negative proportional relationship may be used, a method in which the output voltage of the battery 2 and the reference speed are determined in inverse proportion may be used, or a method in which the reference speed is determined by another function that determines the reference speed to be lower the higher the output voltage of the battery 2 is may be used. The correspondence relationship between the output voltage of the battery 2 and the reference may be determined by a predetermined arithmetic expression (an arithmetic expression that uses the output voltage of the battery 2 as a variable to determine the voltage threshold value Vth, or an arithmetic expression that uses the output voltage of the battery 2 as a variable to determine the reference speed), or may be determined by a table. In this way, the higher the output voltage of the battery 2 is, the more likely it is to determine Yes in step S9, and the stricter the reference for cancellation is, and thus the level of protection can be even higher the higher the output voltage of the battery 2 is. Since the influence when overcurrent occurs is larger the higher the output voltage of the battery 2 is, if this method is adopted, it is easier to achieve an appropriate balance between protection and return.

In any of the embodiments described above, the control unit 12 may adjust the reference so that the reference is set lower the higher the temperature of the switch unit 14 is. In this example, a temperature sensor for detecting the temperature of the switch unit 14 is preferably provided in the shutoff control device 10 or outside the shutoff control device 10. For example, in any of the first, third to fifth embodiments, instead of a method in which the voltage threshold value Vth is a fixed value, a method in which the temperature of the switch unit 14 and the voltage threshold value Vth are defined in a negative proportional relationship may be used, a method in which the temperature of the switch unit 14 and the voltage threshold value Vth are determined in inverse proportion may be used, or a method in which the voltage threshold value Vth is determined by another function that determines the voltage threshold value Vth to be lower the higher the temperature of the switch unit 14 is may be used. Further, in the second embodiment, instead of a method in which the reference speed is a fixed value, a method in which the temperature of the switch unit 14 and the reference speed are defined in a negative proportional relationship may be used, a method in which the temperature of the switch unit 14 and the reference speed are determined in inverse proportion may be used, or a method in which the reference speed is determined by another function that determines the reference speed to be lower the higher the temperature of the switch unit 14 is may be used. The correspondence relationship between the temperature of the switch unit 14 and the reference may be determined by a predetermined arithmetic expression (an arithmetic expression that uses the temperature of the switch unit 14 as a variable to determine the voltage threshold value Vth, or an arithmetic expression that uses the temperature of the switch unit 14 as a variable to determine the reference speed), or may be determined by a table. In this way, the higher the temperature of the switch unit 14 is, the more likely it is to determine Yes in step S9, and the stricter the reference for cancellation is, and thus the level of protection can be even higher the higher the temperature of the switch unit 14 is. Since the influence when overcurrent occurs is larger the higher the temperature of the switch unit 14 is, if this method is adopted, it is easier to achieve an appropriate balance between protection and return.

In embodiments described above, the switch unit 14 is not included in the shutoff control device 10, but the switch unit 14 may be included in the shutoff control device 10.

Note that the embodiments disclosed herein are illustrative in all respects and should be considered not restrictive. The scope of the present disclosure is not limited to the embodiments disclosed herein, and is intended to include all modifications within the scope indicated by the claims or within the range equivalent to the claims.

The invention claimed is:

1. An on-vehicle shutoff control device for controlling an on-vehicle shutoff device including a conductive path forming a power path and a switch unit that switches between an off state of cutting off energization of the conductive path and an on state of allowing energization of the conductive path, the on-vehicle shutoff control device comprising:

a current detection unit configured to detect a value of current flowing through the conductive path; and a control unit configured to switch the switch unit between the off state and the on state, wherein the control unit switches the switch unit from the on state to the off state in a case where the switch unit is in the on state and a current value detected by the current detection unit changes from less than a threshold value to the threshold value or more, and switches the switch unit to the on state in a case where the switch unit has remained in the off state and a potential difference across the switch unit has been continuously maintained less than a reference for a predetermined period of time after switching the switch unit from the on state to the off state, wherein:

the conductive path is a power path to which power from a battery is supplied, and the control unit sets the reference lower the higher an output voltage of the battery is.

2. The on-vehicle shutoff control device according to claim 1, further comprising an energization circuit connected in parallel to the switch unit, wherein the energization circuit includes a current suppressing unit including a resistor unit having a resistance value greater than a resistance value of the switch unit when the switch unit is in the on state or including a constant current circuit through which a constant current lower than the threshold value flows, and is configured to switch between an energized state in which current flows from one side of the switch unit to the other side through the current suppressing unit and a stop state in which energization through the current suppressing unit is stopped, and the control unit switches the switch unit to the on state in a case where the switch unit has remained in the off state, the energization circuit has been maintained in the energized state, and the potential difference across the switch unit has been continuously maintained less than the reference for the predetermined period of time.

3. The on-vehicle shutoff control device according claim 2, wherein the conductive path is a power path to which power from a battery is supplied, and the control unit sets the reference lower the higher an output voltage of the battery is.

4. The on-vehicle shutoff control device according to claim 2, wherein the control unit sets the reference lower the higher a temperature of the switch unit is.

5. The on-vehicle shutoff control device according to claim 1, wherein the control unit sets the reference lower the higher a temperature of the switch unit is.

6. An on-vehicle shutoff control device for controlling an on-vehicle shutoff device including a conductive path forming a power path and a switch unit that switches between an off state of cutting off energization of the conductive path and an on state of allowing energization of the conductive path, the on-vehicle shutoff control device comprising:

a current detection unit configured to detect a value of current flowing through the conductive path; and a control unit configured to switch the switch unit between the off state and the on state, wherein the control unit switches the switch unit from the on state to the off state in a case where the switch unit is in the on state and a current value detected by the current detection unit changes from less than a threshold value to the threshold value or more, and switches the switch unit to the on state in at least one of a case where a speed of increase of a potential difference across the switch unit after switching the switch unit from the on state to the off state is less than a reference, and a case where the potential difference across the switch unit is less than a reference at a time when a predetermined period of time passes after switching the switch unit from the on state to the off state, wherein:

the conductive path is a power path to which power from a battery is supplied, and the control unit sets the reference lower the higher an output voltage of the battery is.

7. The on-vehicle shutoff control device according to claim 6, wherein the control unit changes a voltage threshold value so that the voltage threshold value increases as time passes after switching the switch unit from the on state to the off state, and switches the switch unit to the on state in a case where the potential difference is less than the voltage threshold value after switching the switch unit from the on state to the off state.

8. The on-vehicle shutoff control device according to claim 7, wherein the conductive path is a power path to which power from a battery is supplied, and the control unit sets the reference lower the higher an output voltage of the battery is.

9. The on-vehicle shutoff control device according to claim 7, wherein the control unit sets the reference lower the higher a temperature of the switch unit is.

10. The on-vehicle shutoff control device according to claim 6, wherein the control unit sets the reference lower the higher a temperature of the switch unit is.

* * * * *